Figure 1:
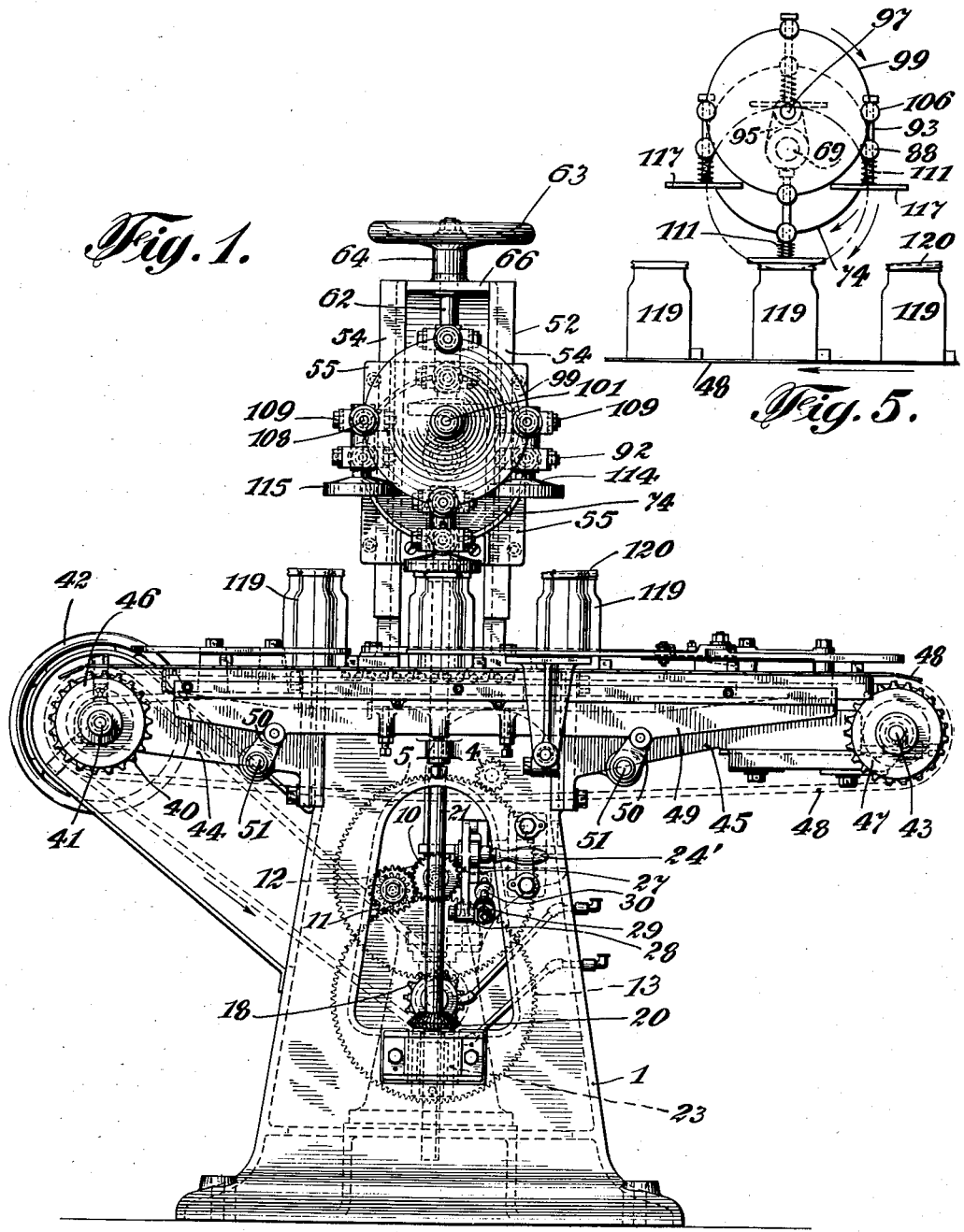

July 5, 1927.

A. PODEL 1,634,723

FRICTION CAP MACHINE

Filed Sept. 20, 1923    4 Sheets-Sheet 1

INVENTOR
*Abraham Podel*
BY
*George Ramsey*
his ATTORNEY

July 5, 1927.

A. PODEL 1,634,723

FRICTION CAP MACHINE

Filed Sept. 20, 1923  4 Sheets-Sheet 2

INVENTOR
Abraham Podel
BY
George Ramsey
his ATTORNEY

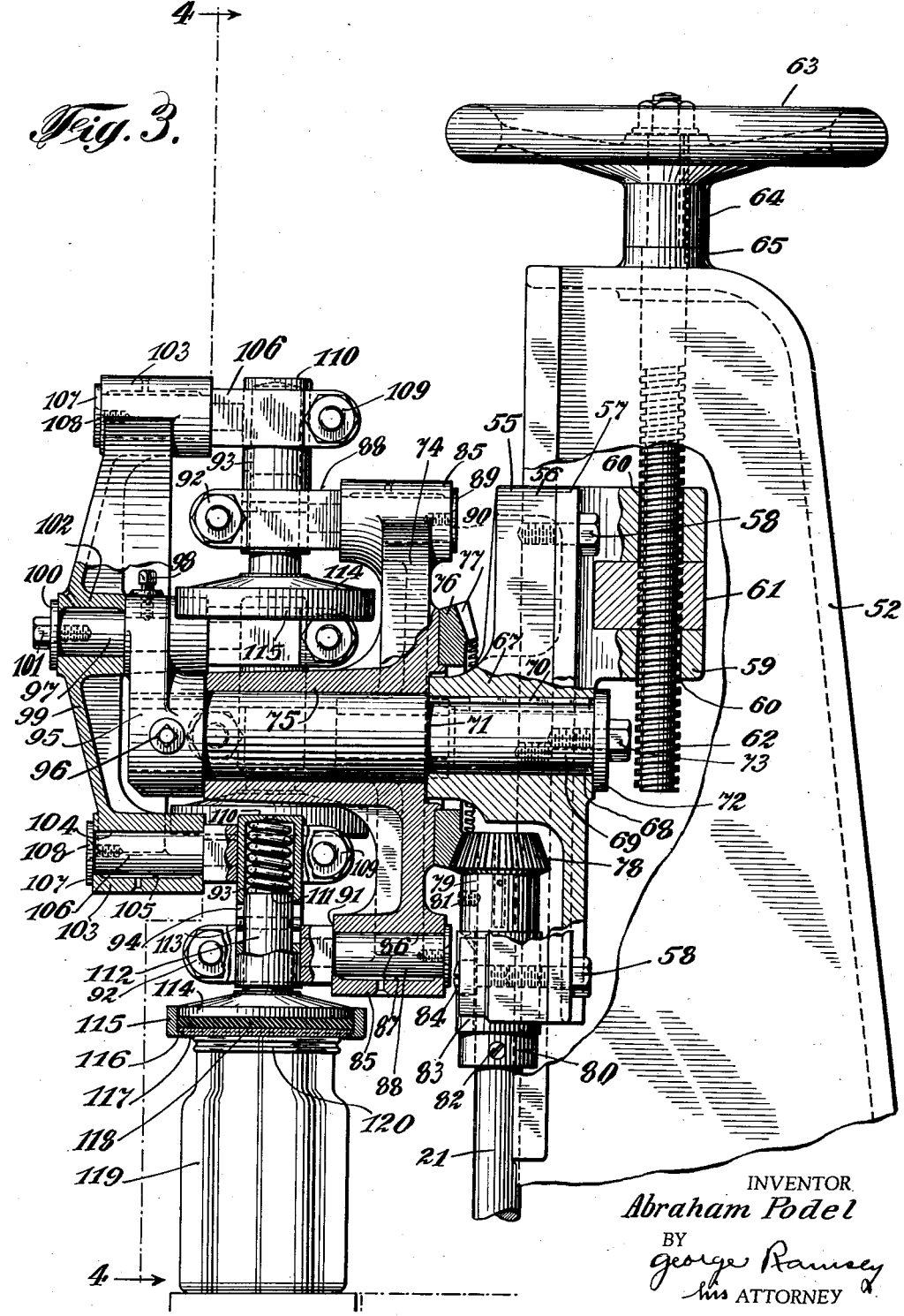

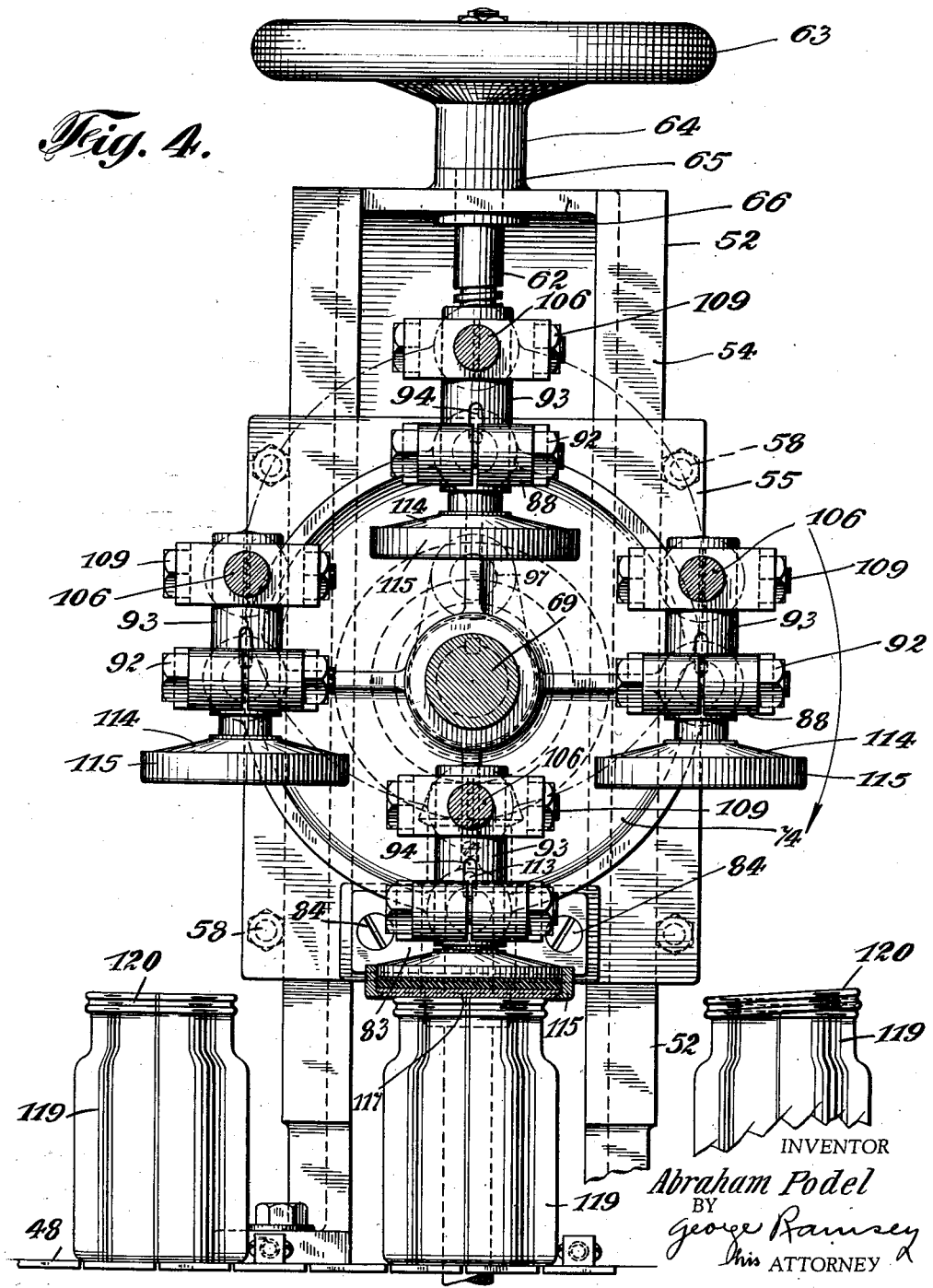

Patented July 5, 1927.

1,634,723

UNITED STATES PATENT OFFICE.

ABRAHAM PODEL, OF LONG ISLAND CITY, NEW YORK, ASSIGNOR TO ANCHOR CAP & CLOSURE CORPORATION, OF LONG ISLAND CITY, NEW YORK, A CORPORATION OF NEW YORK.

FRICTION-CAP MACHINE.

Application filed September 20, 1923. Serial No. 663,860.

This invention relates to a cap sealing machine and more particularly to the type of machine in which metal caps having a flat top and a depending flange are applied by pressure to the top portion of a glass jar or bottle or similar receptacle and are held thereon by friction.

In devices of this character troubles have arisen because the caps were not pressed on with sufficiently accurate coordination between the cap and the container and caused a slopping of the contents of the containers. Also, in machines heretofore used for this purpose the caps were sometimes not started on straight so that they became distorted or stretched beyond the elastic limit of the metal while being applied so that they would not retain their place after being affixed. Such machines were also apt to apply a greater degree of pressure upon one portion of the edge or rim of the caps than upon another thus producing unsatisfactory results or causing the glass edges therebelow to be chipped or cracked.

By the present invention these and other difficulties are overcome and a machine is produced by which the caps can be rapidly applied in a satisfactory manner.

One of the objects of this invention is to produce a machine of this sort by which metal caps having a flat top and a depending flange can be firmly applied to the top of glass bottles or jars and securely held thereon by friction.

Another object of the invention is to produce a machine which will apply such caps in a substantially uniform manner to a series of jars or bottles, which differ slightly in length or height, so that all of them will be effectively sealed.

A further object of the invention is to provide a machine which will press the caps on straight without danger of causing an inordinate amount of pressure to be applied along one edge thereof with the consequent danger of breakage.

Another and further object of the invention is to provide a machine which applies friction caps to receptacles in such manner that the caps will not become distorted or stretched during the course of their application beyond the elastic limit of the metal of which they are made so as to render them liable to become loosened on their seats.

A still further object of the invention is to produce a machine by which the caps can be applied to the receptacles in a continuous manner while the receptacles and the cap pressing element are moving at substantially the same speed and without any sudden acceleration or hinderance at any point thus avoiding the danger of slopping of the contents, or danger of the contents being thrown over the edges of the receptacles, even when they are of a liquid nature, as there is no sudden change in speed of travel of the receptacles.

Another object of the invention is to provide a machine which may be readily and quickly adjusted to apply caps to different series of receptacles of different heights or lengths with equally satisfactory results.

Another object of the invention is to provide a machine for applying caps by pressure to jars or bottles in which the jars or bottles of different heights may be fed at one level.

Another object of the invention is to provide a pressure applying member to press friction caps on receptacles in such manner that the maximum pressure will be applied at a moment corresponding somewhat to the straight line position of a toggle joint thus producing great pressure at the point desired without necessitating the application of a large amount of force at any time from an external source and also thus avoiding any sudden jolts or jars to the mechanism or requiring the storing up of a large amount of power to be used suddenly or providing a motor of excessive capacity to take the peak load.

Other objects and advantages of the invention will be apparent as the description proceeds.

In carrying out this invention a frame or bed of a suitable sort may be provided. A conveyor, such as a traveling belt or carrier, for example, is provided upon which jars, bottles or the like may be fed either automatically or manually and caps of the proper sorts may also be automatically, or manually placed loosely on the tops of such receptacles in any convenient manner either before, simultaneously with or after they are placed upon the carriers. A pressure applying device for applying pressure to the tops of the caps at the proper time and in the appropriate manner and to the requisite extent may be provided at a position sufficiently high above the carrier for the receptacles with the caps thereon to pass thereunder. This pressure applying device comprises preferably a plurality of pressure applying elements which can be made to travel in circular paths at substantially the same circumferential speed at least in one portion of their orbit as the linear speed of travel of the belt or carrier for the jars or bottles. At a point directly below the pressure applying device the belt or carrier is supported or sustained by a table or rollers to resist the thrust of the pressure applying means at that point. The pressure applying device is provided with spring supported pressure members to adapt the same for bottles or jars of slightly varying heights and it is provided with adjustable means by which it can be adapted to apply caps to receptacles of other heights or lengths. An advantage accrues from adjusting the pressure applying device for different heights of receptacles rather than adjusting the height of the carrier especially when the receptacles are fed to the carrier by hand because the operator becomes accustomed to a certain level upon which he places the receptacles and would be apt to strike the carrier or set the jar down with too much force if the conveyor were adjusted to different heights at different times.

The belt or carrier or conveyor for the receptacles is driven by a motor which may be thrown into operation by means of a clutch and the same drive mechanism is geared to the pressure applying device so that the jar or bottle carrier and the pressure applying device will be operated simultaneously and means may be provided by which the machine may be hand driven and at slow speeds. The pressure applying members of the pressure applying device are all caused to maintain the same vertical position so that the faces thereof are always in horizontal planes regardless of the particular positions in which they may be in their circumferential travel as will be more clearly explained below.

The description will be clearly understood from the description and the accompanying drawings in which the same reference characters are used in the different views to designate the same elements.

Figure 2:
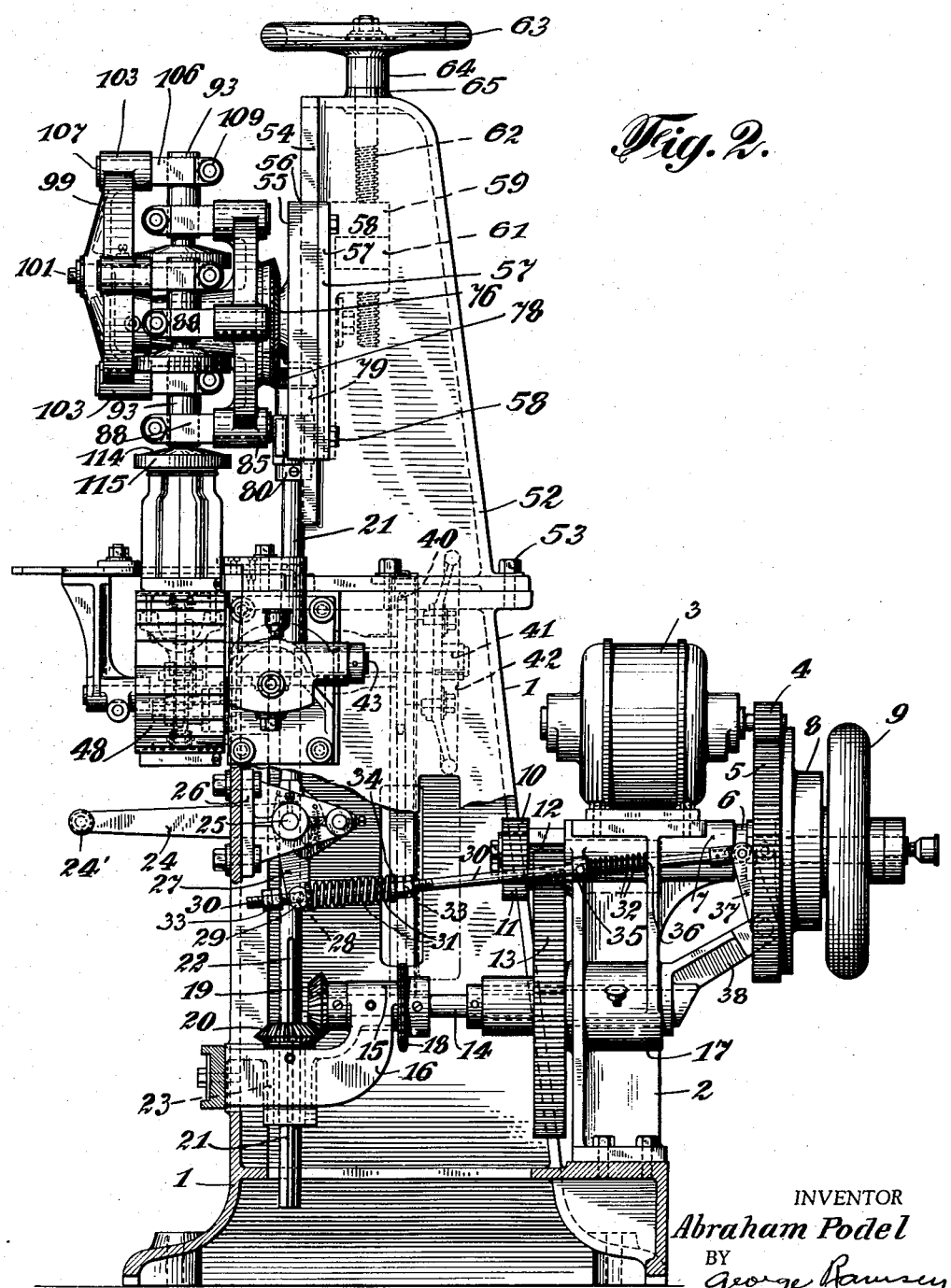

In the drawings which disclose one embodiment of the invention:

Figure 1 is a side elevation of the device;
Figure 2 is an end elevation of the same;
Figure 3 is an enlarged sectional view through the pressure applying device.
Figure 4 is a section along the line 4—4 of Figure 3; and
Figure 5 is a diagrammatic view showing how the pressure applying device operates.

In the drawings reference character 1 designates a frame or bed upon which the device is mounted. A standard 2 is bolted to the bed, and a motor 3 for driving the mechanism is mounted on this standard. A pinion 4 on the motor meshes with the gear 5 which can be clutched by means of the clutch 8 to a shaft 6 mounted in the bearing 7 on the standard 2. The shaft 6 is provided with a fly-wheel 9 at one end and at the other end carries a gear wheel 10 which meshes with a gear wheel 11, which in turn is fixedly connected to a pinion 12 which meshes with a gear wheel 13. The gear wheel 13 is mounted to drive a shaft 14 revolving in a bearing 15 on a bracket 16 and a bearing 17 on the standard 2. The shaft 14 carries a sprocket 18 for driving a conveyor as will be explained below, and also carries at its outer end a bevel gear 19 which meshes with a bevel gear 20. Gear 20 is splined upon a shaft 21 which is provided with a slot 22 to enable the shaft to be raised and lowered axially. The lower end of the shaft 21 is mounted to revolve in the bearing 23 in the bracket 16.

A bell crank 24 having a handle 24' is pivoted at 25 upon a bracket 26. An arm 27 of the bell crank has pivoted in its lower end a wrist pin 28, the end of which pin 28 is provided with a collar 29 that embraces a clutch rod 30 provided with springs 31 and 32 as well as nuts 33 and washers 34. The rod 30 carries a collar 35 between which, and a seat 36 on the standard 2, the spring 32 is interposed. The rod 30 is pivoted to a lever 37, one end of which is pivoted to an arm 38 on the standard 2. This clutch rod and the clutch 8 which it operates is one of the well known types and it is thought unnecessary to describe the same more in detail.

Referring more particularly to Figure 1, it will be seen that a chain drive extends from the sprocket 18 to a sprocket 40 that is mounted upon a shaft 41. This shaft 41 also carries a hand wheel 42 by which the conveyor or carrier can be driven by hand whenever desired. A shaft 43 corresponding somewhat to the shaft 41 is carried on the other side of the frame 1, these two shafts being mounted upon the outer extremities of extensions 44 and 45 which are bolted to the frame 1. Characters 46 and 47 indicate pulleys or rolls for the conveyor such as a belt or carrier 48. This conveyor 48 may be divided into sections or may be marked off for convenience in placing objects thereon and it passes over a bed plate 49 which sustains the same whenever pressure or weight is applied thereto. The bed plate 49 is secured to swing links 50 which are pivoted at the points 51 to the extensions 44 and 45. This makes it possible to effect a limited vertical adjustment of the position of the bed plate.

A hollow standard 52 with one side open is bolted to the base or frame 1 and along one edge thereof guideways 54 are provided for the flat plate 55 which slides along these guideways over the open side of the standard 52. Rearwardly extending flanges 56 at the outer edges of the plate 55 have straps or bars 57 bolted thereto by means of the bolts 58 so that grooves are provided and in which grooves the guides 54 are adapted to slide. A lug having bifurcations 59 and 60 extends backward from the plate 55 into the open space in the standard 52 and an internally threaded insert 61 is interposed between these bifurcations. This insert 61 may be readily replaced by a new one when it becomes worn. A screw 62 passes through the insert 61 and has at its upper end a hand wheel 63 and a shoulder 64 which shoulder rests upon the bearing 65 on the cross piece 66 at the top of the standard 52.

The plate 55 carries an enlargement 67 near its center which is pierced with a hole 68 in which is mounted a stud bolt 69 which is prevented from turning therein by the key 70. The stud bolt 69 carries a shoulder 71 which bears against the front of the enlargement 67 and the stud bolt is retained in place by means of a washer 72 which is held upon the end of the stud bolt 69 by means of a small bolt 73. A spider 74 having a long hollow bearing 75 is mounted to revolve upon the stud bolt 69, an annular beveled gear 76 with teeth 77 being rigidly attached to the spider 74 for driving the same. Gear 76 meshes with a bevel gear 78 attached to the upper end of the shaft 21. Collars 79 and 80 are fastened upon the shaft 21 upon the respective sides of a bearing 83, the collars being fastened to the shaft 21 by means of set screws 81 and 82. The bearing 83 is attached to the lower edge of the plate 55 by means of a bolt 84 so that when the plate 55 is caused to slide up and down on the guide 54, the shaft 21 will be moved up and down, the bevel gear 78 continuing to mesh with gear 76 as it is fixed at a predetermined distance therefrom and the bevel gear 20 continuing to mesh with the bevel gear 19 as the shaft 21 is free to slide with respect to the bevel gear 20 and still be driven thereby.

Enlargements 85 on the periphery of the spider 74 have holes 86 therethrough as well as oil spaces 87. Stud bolts 88 are mounted to revolve in the holes 86 and are retained therein by means of the retaining washers 89 that are fastened to the stud bolts 88 by means of screws 90. Shoulders 91 on the stud bolts bear against the enlargements 85. The stud bolts are bifurcated and are provided with clamping bolts 92 by means of which they can be rigidly clamped upon sleeves 93 which are slotted at 94.

An arm 95 is fastened by means of a set screw 96 upon the outer end of the stud bolt 69, and a stud bolt 97 is fastened in the upper end of the arm 95 by means of a set screw 98. A spider 99 revolves upon the stud bolt 97 being held thereon by means of a washer 100 and a screw bolt 101. The spider 99 is provided with a bearing 102 at its center so that it will revolve freely.

Enlargements 103 are provided upon the periphery of the spider 99 similar to the enlargements 85 on the spider 74. Holes 104 in the enlargements 103 are provided as well as oil spaces 105, and stud bolts 106 similar to stud bolts 88 are mounted to revolve therein and are retained in place by means of the retaining washers 107 and screws 108. The stud bolts 106 are bifurcated at their outer ends and clamping bolts 109 are provided to clamp the same rigidly to the sleeves 93.

The sleeves 93 are closed at their upper ends 110 and contain compression springs 111 each one of which bears against a shaft or rod 112 which constitutes the stem of a pressure member. A cross pin 113 extends through the stem 112 into the slots 94 of each sleeve 93. The lower end of the rod 112 terminates in the circular plate or disc 114 which is surrounded by a ring 115 provided with an internal flange 116 upon which the disc or wearing plate 117 with a rabbeted peripheral edge is placed. Resilient material 118 is interposed between the wearing plate 117 and the plate or disc 114. 119 represents jars or receptacles upon which caps 120 are to be placed.

The operation is as follows:

The motor 3 is set in operation and when the clutch 8 is thrown the shaft 14 is driven thereby driving the conveyor 48 through the sprocket 18, and driving the pressure applying device through the gear 20 and the shaft 21. Bottles, jars or the like are fed upon the conveyor 48 either automatically or by hand preferably at such intervals that the time of successive arrivals of the receptacles at the pressure applying position will synchronize with the arrival of the successive pressure applying plates 117. Caps 120 will be loosely placed on top of the receptacles before or at the time they arrive at the pressure applying device or these caps may be fed to the lower faces of the pressure members 117 at the proper moment to be pressed upon the receptacles. As the jars or receptacles pass under the pressure applying members 117, the caps will be gradually pressed downwardly thereon in an even manner without twisting or skewing the same as the pressure plates 117 will be always maintained in a horizontal position irrespective of the position in which they may be. These plates 117 will be made of sufficient area so that the caps will be properly pressed on even though the receptacles are not placed in exactly the correct positions on the conveyor 48.

It will be observed that if it were attempted to cause the pressure applying members to force the caps on when these members are traveling, for example, along the right hand side of their path of travel as shown in Figure 5, considerable power would be necessary to drive the same because of the long lever arm between them and the point of revolution of the same, but when they are caused to force the caps on when they are near the lowest extremity of their travel, the horizontal component of their speed can be made approximately equal to the speed of the conveyor on which the jars are carried and the slight vertical movement of these pressure applying members when they have reached the position in which they will force the caps on to the containers will be almost vertically below their center of revolution and their maximum pressure will be exerted when they are on a vertical line passing through their center of revolution. The springs 111 will compensate for slight variations in the heights or lengths of the receptacles so that the same will not be broken.

In case it is desired to apply caps to jars or receptacles of greater length the hand wheel 63 is turned thereby drawing the plate 55 carrying the pressure applying mechanism upward along the guides 54 until the same has reached a point the proper distance above the conveyor 48 so that the jars may be passed under the same and have the caps pressed thereon to the proper extent. As already stated, by adjusting the pressure head instead of adjusting the height of the conveyor 48, the operators can become accustomed to placing the jars or receptacles upon a conveyor at a certain height, and they would not have to accustom themselves to placing these jars upon conveyors at different elevations with the danger of setting the same down too hard.

Since the stems 93 of the pressure members are held by clamps, the pressure members are capable of a limited amount of individual vertical adjustment in addition to the collective adjustment of all of the pressure members obtained by moving the head of the machine. This individual adjustment of the pressure members permits accurate correlation of the various members and enables any individual member to be adjusted to compensate for wear of the pressing face 117, for differences in thickness of the resilient pads 118, and for differences in the strength of the springs 111.

Figure 5 is a diagrammatic view showing how the stem of the pressure members are maintained in a vertical position regardless of the position in which they may be in their circumferential orbit of travel, thus keeping the faces of these pressure members always horizontal so that they will press the caps straight downwardly without any tendency to skew or press them on at an angle. In this view the circles 74 and 99 indicate diagrammatically the spiders correspondingly numbered in other views. It will be obvious from Figure 3 that since the stud bolts 88 and 106, between which the sleeves 93 are clamped, are pivoted at fixed points around the spiders 74 and 99 the sleeves 93 operate to cause these spiders to turn at exactly the same speed. It results therefore that if the stud bolts 88 and 106 are clamped to the sleeves so that the sleeves are vertical they will so remain throughout their entire transit, and the rods or stems 112 carried thereby will be likewise kept vertical at all times so that the faces of the pressure members will be always horizontal as stated.

Having described my invention, I claim:

1. A closure applying machine comprising a machine element pivoted on a first axis, a second machine element pivoted on an axis parallel to and displaced from said first axis to rotate in a plane parallel to and spaced from the plane of rotation of said first machine element, and a closure applying member pivoted to each of said machine elements and positioned between their planes of rotation.

2. A closure applying machine comprising a machine element pivoted on a first axis, a second machine element pivoted on an axis parallel to and displaced from said first axis to rotate in a plane parallel to and spaced from the plane of rotation of said first machine element, and a spring pressed closure applying member pivoted to each of said machine elements and positioned between their planes of rotation.

3. A closure applying machine comprising a spider pivoted on a first axis, a second spider pivoted on an axis parallel to and displaced from said first axis, and a closure applying member located between the planes of rotation of said spiders and pivoted to each of said spiders.

4. A closure applying machine comprising a spider pivoted on a first axis, a second spider pivoted on an axis parallel to said first axis, and a plurality of closure applying members pivoted to each of said spiders and adapted to be successively brought into engagement with closures to be applied, said closure applying members being located between the planes of rotation of said spiders.

5. A closure applying machine comprising a machine element pivoted on a first axis; a second machine element pivoted on an axis parallel to and displaced from said first axis to rotate in a plane parallel to and spaced from the plane of rotation of said first machine element; a plurality of closure applying elements; individual stems secured to said closure applying elements; and individual pairs of means adjustably clamped to said stems, one of the means of each pair being pivoted to one of said machine elements and the other means of each pair being pivoted to the other of the machine elements.

6. A closure applying machine comprising an arm pivoted on a first axis; a second arm pivoted on an axis parallel to and spaced from said first axis to rotate in a plane parallel to and spaced from the plane of rotation of said first arm; a hollow stem between said planes of rotation, said stem being pivotally connected to each of said arms; a plunger within said stem having a limited longitudinal movement with respect to said stem; a closure applying member attached to said plunger; and spring means urging said plunger longitudinally with respect to said stem.

7. A closure applying machine comprising an arm pivoted on a first axis, a second arm pivoted on an axis parallel to and spaced from said first axis to rotate in a plane parallel to and spaced from the plane of rotation of said first arm, a closure applying member pivoted to each of said arms and positioned between the planes of rotation of said arms, and means to drive one of said arms, whereby both arms are rotated and the closing applying member is carried through an orbital path.

8. A closure applying machine comprising a pair of rotating members slightly separated and driven from the same source of power, said members having independent axes of rotation, and a common member adapted to engage closures or the like mounted between said rotating members and adapted to rotate therewith, the mounting of said common member comprising means to maintain said common member in substantially the same angular position with respect to a horizontal plane.

9. A closure applying machine, comprising a pair of rotating members driven from the same source of power, said members having independent axes of rotation, a plurality of closure applying elements, individual stems secured to said closure applying elements and individual pairs of means secured to said stems, one of the means of each pair being pivoted to one of said rotating members and the other means of each pair being pivoted to the other of said rotating members.

ABRAHAM PODEL.